US010846535B2

United States Patent
Leppänen et al.

(10) Patent No.: US 10,846,535 B2
(45) Date of Patent: Nov. 24, 2020

(54) VIRTUAL REALITY CAUSAL SUMMARY CONTENT

(71) Applicant: Nokia Technologies Oy, Espoo (FI)

(72) Inventors: Jussi Leppänen, Tampere (FI); Arto Lehtiniemi, Lempäälä (FI); Antti Eronen, Tampere (FI); Francesco Cricrì, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/093,769

(22) PCT Filed: Apr. 12, 2017

(86) PCT No.: PCT/FI2017/050271
§ 371 (c)(1),
(2) Date: Oct. 15, 2018

(87) PCT Pub. No.: WO2017/182702
PCT Pub. Date: Oct. 26, 2017

(65) Prior Publication Data
US 2019/0130193 A1    May 2, 2019

(30) Foreign Application Priority Data
Apr. 21, 2016   (EP) ..................... 16166501

(51) Int. Cl.
*H04N 9/43*       (2006.01)
*G06K 9/00*       (2006.01)
(Continued)

(52) U.S. Cl.
CPC .......... *G06K 9/00751* (2013.01); *G06F 3/011* (2013.01); *G06F 3/013* (2013.01);
(Continued)

(58) Field of Classification Search
USPC .......................................... 348/36
See application file for complete search history.

(56) References Cited

U.S. PATENT DOCUMENTS

| 8,502,524 B2* | 8/2013 | Leppanen | G01R 19/0092 324/120 |
| 8,838,147 B2* | 9/2014 | Eronen | G01S 19/39 455/456.3 |

(Continued)

OTHER PUBLICATIONS

Extended European Search Report received for corresponding European Patent Application No. 16166501.3, dated Oct. 10, 2016, 9 pages.

(Continued)

*Primary Examiner* — Nigar Chowdhury
(74) *Attorney, Agent, or Firm* — Harrington & Smith

(57) ABSTRACT

An apparatus configured to: •in respect of virtual reality content comprising video imagery configured to provide a virtual reality space for viewing in virtual reality, wherein a virtual reality view presented to a user provides for viewing of the virtual reality content, the virtual reality view comprising a spatial portion of the video imagery that forms the virtual reality space and being smaller in spatial extent than the spatial extent of the video imagery of the virtual reality space and •based on one or more of; •i) a viewing direction in the virtual reality space of at least one virtual reality view provided to the user; and •ii) a selected object in the video imagery, •providing for one or more of generation or display of causal summary content comprising selected content from the virtual reality content at least prior to a time point in the virtual reality content currently viewed by the user, the causal summary content at least focussed on an object or event appearing in the at least one virtual reality view or the selected object to show the historic occurrence of the object or event or selected object in the virtual reality content, (Continued)

•wherein the provision of one or more of generation or display of causal summary content is further based on the virtual reality view provided to the user historically not including the object or event or selected object for at least a predetermined period of time thereby providing causal summary content for objects or events that were missed by the user while watching the virtual reality content.

17 Claims, 4 Drawing Sheets

(51) Int. Cl.
    *G06F 16/738*     (2019.01)
    *G06F 3/01*     (2006.01)
    *G06F 16/74*     (2019.01)
    *G06F 16/70*     (2019.01)
    *H04N 21/422*     (2011.01)
    *H04N 13/156*     (2018.01)
    *H04N 13/366*     (2018.01)
    *G06T 7/20*     (2017.01)
    *H04N 5/445*     (2011.01)

(52) U.S. Cl.
    CPC ............ *G06F 16/70* (2019.01); *G06F 16/739* (2019.01); *G06F 16/74* (2019.01); *G06F 16/745* (2019.01); *G06F 16/748* (2019.01); *G06K 9/00671* (2013.01); *G06T 7/20* (2013.01); *H04N 5/445* (2013.01); *H04N 13/156* (2018.05); *H04N 13/366* (2018.05); *H04N 21/42204* (2013.01)

(56) References Cited

U.S. PATENT DOCUMENTS

| | | | |
|---|---|---|---|
| 9,530,426 B1 * | 12/2016 | Wright | H04S 1/002 |
| 9,595,115 B1 * | 3/2017 | Cederlof | G06T 7/20 |
| 10,048,751 B2 * | 8/2018 | Jaafar | G06F 3/013 |
| 2006/0117356 A1 | 6/2006 | Jojic et al. | |
| 2007/0070069 A1 | 3/2007 | Samarasekera et al. | |
| 2007/0196809 A1 * | 8/2007 | Sen | A63F 13/02 |
| | | | 434/365 |
| 2008/0310707 A1 * | 12/2008 | Kansal | G06T 19/006 |
| | | | 382/154 |
| 2010/0257252 A1 * | 10/2010 | Dougherty | G06T 19/006 |
| | | | 709/217 |
| 2010/0277468 A1 * | 11/2010 | Lefevre | G06T 15/00 |
| | | | 345/419 |
| 2012/0001938 A1 * | 1/2012 | Sandberg | H04W 4/21 |
| | | | 345/633 |
| 2012/0163657 A1 | 6/2012 | Shellshear | |
| 2012/0206452 A1 * | 8/2012 | Geisner | G02B 27/017 |
| | | | 345/419 |
| 2012/0263311 A1 * | 10/2012 | Neugebauer | G10K 15/12 |
| | | | 381/63 |
| 2013/0050260 A1 | 2/2013 | Reitan | |
| 2013/0117377 A1 * | 5/2013 | Miller | H04L 67/38 |
| | | | 709/205 |
| 2014/0063061 A1 * | 3/2014 | Reitan | G09G 3/003 |
| | | | 345/633 |
| 2014/0152558 A1 * | 6/2014 | Salter | G06F 3/013 |
| | | | 345/157 |
| 2014/0306866 A1 * | 10/2014 | Miller | G06T 19/006 |
| | | | 345/8 |
| 2015/0193979 A1 * | 7/2015 | Grek | G06F 1/1694 |
| | | | 345/633 |
| 2015/0212576 A1 * | 7/2015 | Ambrus | G06F 3/013 |
| | | | 345/156 |
| 2015/0235432 A1 * | 8/2015 | Bronder | G06T 19/006 |
| | | | 345/633 |
| 2015/0325052 A1 * | 11/2015 | Kuehne | G06T 19/006 |
| | | | 345/633 |
| 2015/0331576 A1 * | 11/2015 | Piya | G06F 3/011 |
| | | | 715/850 |
| 2016/0033770 A1 * | 2/2016 | Fujimaki | G06T 19/006 |
| | | | 345/8 |
| 2016/0110922 A1 * | 4/2016 | Haring | G06T 13/40 |
| | | | 345/633 |
| 2016/0171179 A1 * | 6/2016 | Donofrio | G06F 16/26 |
| | | | 705/2 |
| 2016/0196692 A1 * | 7/2016 | Kjallstrom | G06T 19/006 |
| | | | 345/633 |
| 2016/0210602 A1 * | 7/2016 | Siddique | G06Q 20/0453 |
| 2017/0084051 A1 * | 3/2017 | Weising | G09G 5/08 |
| 2017/0124713 A1 * | 5/2017 | Jurgenson | G06T 19/006 |
| 2017/0270713 A1 * | 9/2017 | Dooley | G06T 19/006 |
| 2020/0159388 A1 * | 5/2020 | Piya | G06F 3/011 |

OTHER PUBLICATIONS

International Search Report and Written Opinion received for corresponding Patent Cooperation Treaty Application No. PCT/FI2017/050271, dated Jul. 7, 2017, 13 pages.

\* cited by examiner

VIRTUAL REALITY CAUSAL SUMMARY CONTENT

RELATED APPLICATION

This application was originally filed as Patent Cooperation Treaty Application No. PCT/FI2017/050271 filed Apr. 12, 2017 which claims priority benefit to EP Patent Application No. 16166501.3, filed Apr. 21, 2016.

TECHNICAL FIELD

The present disclosure relates to the field of virtual reality and, in particular, to the generation or display of causal summary content from virtual reality content. Associated methods, computer programs and apparatus is also disclosed. Certain disclosed aspects/examples relate to portable electronic devices.

BACKGROUND

Virtual reality may use a headset, such as glasses or goggles, or one or more displays that surround a user to provide the user with an immersive virtual experience. A virtual reality apparatus may present multimedia virtual reality content representative of a virtual reality space to a user to simulate the user being present within the virtual reality space. The virtual reality space may be provided by a panoramic video, such as a video having a wide or 360° field of view (which may include above and/or below a horizontally oriented field of view). A consequence of the video imagery that forms the virtual reality space being larger than what a user is able to view at any one time is that objects or events can be missed.

The listing or discussion of a prior-published document or any background in this specification should not necessarily be taken as an acknowledgement that the document or background is part of the state of the art or is common general knowledge. One or more aspects/examples of the present disclosure may or may not address one or more of the background issues.

SUMMARY

In a first example aspect there is provided an apparatus comprising:
 at least one processor; and
 at least one memory including computer program code,
 the at least one memory and the computer program code configured to, with the at least one processor, cause the apparatus to perform at least the following:
 in respect of virtual reality content comprising video imagery configured to provide a virtual reality space for viewing in virtual reality, wherein a virtual reality view presented to a user provides for viewing of the virtual reality content, the virtual reality view comprising a spatial portion of the video imagery that forms the virtual reality space and being smaller in spatial extent than the spatial extent of the video imagery of the virtual reality space and based on one or more of;
  i) a viewing direction in the virtual reality space of at least one virtual reality view provided to the user; and
  ii) a selected object in the video imagery,
 provide for one or more of generation or display of causal summary content comprising selected content from the virtual reality content at least prior to a time point in the virtual reality content currently viewed by the user, the causal summary content at least focussed on an object or event appearing in the at least one virtual reality view or the selected object to show the historic occurrence of the object or event or selected object in the virtual reality content.

This is advantageous as due to the large spatial extent of the video imagery of the virtual reality content it is not possible for a user to view the entire spatial extent of the video imagery at any one time point when consuming VR content and therefore events and objects outside the virtual reality view of the user are not witnessed. This may lead to confusion or bewilderment when an object or event is provided for display in the VR view but the user has not viewed (or has viewed but not noticed) some or all of the video imagery that leads to the object being where it is or the event occurring. Accordingly, the apparatus advantageously provides for generation or display of causal summary content derived from the VR content that shows the historic presence of an object in the video imagery or the historic occurrence of an event(s) related to a particular object/event.

In one or more embodiments, the provision of one or more of generation or display of causal summary content is further based on the virtual reality view provided to the user historically not including the object or event or selected object for at least a predetermined period of time thereby providing causal summary content only for objects or events that were missed by the user while watching the virtual reality content.

In one or more embodiments, the selected content is selected based on;
 predefined causal data comprising references to spatial portions of the video imagery over time in which the object or selected object is present or the event occurs, wherein a viewing direction of at least one of said spatial portions is in common with the viewing direction of said at least one virtual reality view provided to the user or the viewing direction of the selected object.

In one or more embodiments, the selected content is selected based on;
 image analysis of the video imagery to identify the selected object or an object in said at least one virtual reality view provided to the user in at least temporally prior video imagery of the virtual reality content.

This generation/display of the causal summary content may be advantageously based on where in the virtual reality space the user is looking (i.e. what part of the video imagery the user is watching in their virtual reality view) or what the user has selected (e.g. an object, person, character or group of objects or characters), so that the user can see past events, chains of events or prior occurrences of the object in the virtual reality content (i.e. the causal summary content) that leads to the time point at which the causal summary content was generated/displayed. Thus, causal summary content may be suggested to the user based on analysis of what the user has been viewing or may be provided in response to user selection of an object. Accordingly, by way of the causal summary content, the user can see where a particular object (e.g. person) entered the scene and how it/they arrived in their virtual reality view. Those past events, rather than be specific to an object, may track a series of events or people that lead to a scene presented in the virtual reality view. For example, if the user requests to view causal summary content when the user notices an attacked character slumped on the floor, the past events may relate to the character's attackers and other related events leading up to the character being attacked.

Further, advantageously, whether to provide for generation/display of causal summary content may be determined in a plurality of ways. The virtual reality content or information associated therewith may include predefined causal data that comprises data that spatially tracks objects and/or events in the video imagery over time. Thus, a comparison between the viewing direction of the virtual reality view, i.e. where the user is looking while consuming the VR content, and the predefined causal data can identify objects or events, the spatial position of which is defined by the predefined causal data, that the user may have missed. If the viewing direction of the VR view and at least one viewing direction defined in the causal summary content is in common (i.e. within a threshold angle of one another) then the user may wish to view the causal summary content associated with the events/objects in their VR view. Further, using a plurality of viewing directions of the VR view and by comparison with the predefined causal data, the apparatus can identify objects or events, the spatial position of which is defined by the predefined causal data, that the user has missed. Thus, objects or events that may be interesting to a user and which may be provided as causal summary content may comprise those which the user has viewed for at least a first predetermined period of time (presumed sufficient to notice the object/event) and has not viewed for at least a second predetermined period of time. The first predetermined time may be at least 5, 10, 15, 30, 60, 90 seconds or more. The second predetermined time may be at least 5, 10, 15, 30, 60, 90 seconds or more or a predetermined percentage of the time that the object/event appears in the virtual reality content. Thus, if an object or event occurs over a 30 second period, understanding the presence of such an object or event may be difficult if the user's VR view was not focussed on the object or event if only for a short amount of time.

In one or more embodiments, the provision of the causal summary content is based on a comparison between the viewing direction of the virtual reality view provided to the user and the predefined causal data, and the identification of an object, event or chain of events that the user has viewed for at least a first predetermined period of time and has not viewed for at least a second predetermined period of time. Thus, the predefined causal data may define the viewing direction of objects and/or events and with the viewing direction of the VR view provided to the user, it can be determined whether or not a user viewed those objects and events.

Thus, the apparatus may be configured to identify, using a recent subset of viewing directions, a particular object or event that the user is viewing in their VR view and, using a less recent subset of viewing directions, determine that the user was not viewing the same object or event (or a related chain of events) during earlier consumption of the VR content and therefore causal summary content may be generated or displayed in relation to the object or event (or a related chain of events). For example, an object that has recently appeared in the user's virtual reality view but the user may not know where it came from because they were not looking in the appropriate direction (i.e. their virtual reality view was directed in the appropriate direction) may be identified and corresponding causal summary content provided.

In one or more embodiments, the selected object in the video imagery is user selected.

This is advantageous as a user can select an object, such as a thing, character or combination of things/characters appearing in the video imagery, and causal summary content can be provided for the selected object. Accordingly, in one or more examples, the apparatus may determine whether predefined causal data is available for the selected object and, if so, provide the causal summary content based on the predefined causal data. In one or more examples, the apparatus may provide for determination, such as by image analysis of the video imagery (such as if predefined causal data is not available for the selected object), of occurrences of the selected object in prior video imagery in order to provide the causal summary content based on said image analysis. The image analysis may include object recognition including facial recognition.

In one or more examples, the user selection of an object in the video imagery is provided by one or more of: a gaze that persists on the object for more than a predetermined time, a gaze on the object with a selection input, a voice command, an input provided through an input device such as a tablet, mobile phone, smart phone or computer.

In one or more embodiments, an object in the video imagery is automatically selected as the selected object based on the viewing direction of the current virtual reality view aligning with said object within a threshold.

Thus, rather than require a selection input from the user, the apparatus may provide for automatic selection of one or more objects in the virtual reality view based on what is visible in said virtual reality view. For example, an object at substantially the centre of the virtual reality view may be automatically selected. In one or more examples, the apparatus may be configured to determine whether predefined causal data is present for any object(s)/event(s) present in the current virtual reality view and provide for its/their selection. The apparatus may provide for performing of image analysis of the current virtual reality view to identify objects that can then be tracked back through prior video imagery and provide for their selection. One or more causal-summary-indicator graphics may be provided for display to identify the automatically selected objects in the virtual reality view for which causal summary content is available either prior to or after the generation of said causal summary content. The or each causal-summary-indicator graphic may be positioned in the virtual reality view to associate it with its object. The causal-summary-indicator graphics may be user selectable, wherein on user selection, the causal summary content is generated or displayed. Thus, the causal-summary-indicator graphics advantageously show the user for which objects causal summary content is available. In one or more examples, the provision of display of causal-summary-indicator graphics is further based on a determination that the user's virtual reality view was, in the past, oriented such that the objects or event was not, for at least a predetermined amount of time, visible in the virtual reality view. Thus, rather than display causal-summary-indicator graphics for all objects/events that such causal summary content could be generated or displayed, an assessment of whether or not the user has missed (i.e. not viewed a spatial portion of) associated video imagery is used to limit the display of summary-available graphics to those for objects/events that may be interesting to the user. The predetermined amount of time (such as at least 10, 20, 30 seconds or 1 minute) is advantageous to distinguish between objects/events that have been truly missed and those for which the user only briefly glanced away from the action.

In one or more embodiments, the predefined causal data comprises a data set of at least the viewing direction in the virtual reality space versus time thereby providing a reference to portions of the video imagery to track the spatial location in the virtual reality space of an object or event or chain of events appearing in the video imagery over time.

In one or more examples, the predefined causal data may comprise the time evolution of the viewing direction of an object or event. Thus, the viewing direction in which the virtual reality view must be oriented (within a threshold related to the field of view of the virtual reality view) to witness the object or event over time may be conveniently stored. The predefined causal data may be integrated with the virtual reality content or may be separate but associated therewith.

In one or more examples, the predefined causal data is one or more of manually provided based on human analysis of the virtual reality content during capture or in post-production and automatically generated based on computer based image analysis of the video imagery.

In one or more examples the predefined causal data is generated on-the-fly either as part of preparing the virtual reality content for display to the user or during the display of the virtual reality content to the user. Thus, the video imagery may be analyses using object/facial recognition techniques during playback or in preparation therefor.

In one or more embodiments, the predefined causal data comprises one or more predefined causal data sets, each predefined causal data set providing for spatial tracking of one or more of an object, an event or a chain of events in the video imagery over time and the selected video imagery is determined based on a selection of one of the plurality of predefined causal data sets, the selection based on comparison between viewing directions of the virtual reality view provided to the user and the viewing directions of each of the plurality of predefined causal data sets.

Thus, advantageously, the predefined causal data sets can be used to identify objects, events or a chain of events that have only been partially shown in the user's virtual reality view. The apparatus may then use an identified predefined causal data set to select the video imagery for generation or display of the causal summary content.

In one or more embodiments, the causal summary content comprises one or more of;
  i) summary video imagery extracted from the video imagery of the virtual reality content;
  ii) summary still imagery extracted from the video imagery of the virtual reality content;
  iii) summary virtual reality content extracted from the video imagery of the virtual reality content wherein at least an initial viewing direction of the summary virtual reality content is aligned with the one or more of the selected object and viewing direction of the predefined causal data;
  iv) summary virtual reality content extracted from the video imagery of the virtual reality content wherein the summary virtual reality content has a spatial extent less than the spatial extent of the virtual reality content.

Thus, the causal summary content may be advantageously focussed on the object, event or chain of events and may be presented in a number of ways to the user. Thus, the causal summary content may comprise video imagery, such as non-panoramic or panoramic video imagery, which is extracted from the virtual reality content and which is focussed on the spatial extent of the video imagery of the virtual reality content in which the object, event or chain of events occur. The causal summary content may comprise a series of still images showing the object, event or chain of events, which may be frames from the video imagery of the virtual reality content. The causal summary content may comprise virtual reality content, the display of which is controlled to focus the user's virtual reality view on the missed object, event or chain of events. For example, the spatial extent of the video imagery may be reduced to focus the user's attention or the ability to look elsewhere in the virtual reality content may be restricted or fixed relative to "normal" consumption of the virtual reality content. The apparatus may provide for a change in format of the causal summary content in response to user input. For example, the display of summary still images may be replaced or supplemented with summary video images upon user input.

In one or more embodiments, the selected content of the causal summary content is further selected based on a comparison between historic viewing directions of the virtual reality view provided to the user and the viewing direction of the portions of video imagery defined in the predefined causal data or the viewing directions of the selected object, to thereby provide un-viewed content as at least part of the causal summary content.

In one or more examples, at least a majority of or all of the selected content is selected based on the absence of a correlation between;
  a) the historic viewing directions of the virtual reality view provided to the user; and
  b) the viewing direction of the portions of video imagery defined in the predefined causal data or the viewing directions of the selected object.

In one or more embodiments, the apparatus provides for display of the causal summary content in response to a user input request to play said causal summary content following the provision of a causal-summary-content indicator indicative of the availability of causal summary content.

In one or more embodiments, the causal-summary-content indicator is one or more of a graphic provided for display in the virtual reality view and an audible indicator.

In a second aspect there is provided a method, the method comprising;
  in respect of virtual reality content comprising video imagery configured to provide a virtual reality space for viewing in virtual reality, wherein a virtual reality view presented to a user provides for viewing of the virtual reality content, the virtual reality view comprising a spatial portion of the video imagery that forms the virtual reality space and being smaller in spatial extent than the spatial extent of the video imagery of the virtual reality space and
  based on one or more of;
    i) a viewing direction in the virtual reality space of at least one virtual reality view provided to the user; and
    ii) a selected object in the video imagery,
  providing for one or more of generation or display of causal summary content comprising selected content from the virtual reality content at least prior to a time point in the virtual reality content currently viewed by the user, the causal summary content at least focussed on an object or event appearing in the at least one virtual reality view or the selected object to show the historic occurrence of the object or event or selected object in the virtual reality content.

In a third aspect there is provided a computer readable medium comprising computer program code stored thereon, the computer readable medium and computer program code being configured to, when run on at least one processor, perform the method of
  in respect of virtual reality content comprising video imagery configured to provide a virtual reality space for viewing in virtual reality, wherein a virtual reality view presented to a user provides for viewing of the virtual reality content, the virtual reality view comprising a spatial portion of the video imagery that forms the virtual reality space and being smaller in spatial extent than the spatial extent of the video imagery of the virtual reality space and based on one or more of;
  i) a viewing direction in the virtual reality space of at least one virtual reality view provided to the user; and
  ii) a selected object in the video imagery,
providing for one or more of generation or display of causal summary content comprising selected content from the virtual reality content at least prior to a time point in the virtual reality content currently viewed by the user, the causal summary content at least focussed on an object or event appearing in the at least one virtual reality view or the selected object to show the historic occurrence of the object or event or selected object in the virtual reality content.

In a further aspect there is provided an apparatus, the apparatus comprising means configured to, in respect of virtual reality content comprising video imagery configured to provide a virtual reality space for viewing in virtual reality, wherein a virtual reality view presented to a user provides for viewing of the virtual reality content, the virtual reality view comprising a spatial portion of the video imagery that forms the virtual reality space and being smaller in spatial extent than the spatial extent of the video imagery of the virtual reality space and based on one or more of;
  i) a viewing direction in the virtual reality space of at least one virtual reality view provided to the user; and
  ii) a selected object in the video imagery,
provide for one or more of generation or display of causal summary content comprising selected content from the virtual reality content at least prior to a time point in the virtual reality content currently viewed by the user, the causal summary content at least focussed on an object or event appearing in the at least one virtual reality view or the selected object to show the historic occurrence of the object or event or selected object in the virtual reality content.

The present disclosure includes one or more corresponding aspects, examples or features in isolation or in various combinations whether or not specifically stated (including claimed) in that combination or in isolation. Corresponding means and corresponding functional units (e.g., function enabler, video imagery extractor, video imagery compiler, viewing direction measurer, viewing direction modifier, video player, direction sensor) for performing one or more of the discussed functions are also within the present disclosure.

Corresponding computer programs for implementing one or more of the methods disclosed are also within the present disclosure and encompassed by one or more of the described examples.

The above summary is intended to be merely exemplary and non-limiting.

BRIEF DESCRIPTION OF THE FIGURES

A description is now given, by way of example only, with reference to the accompanying drawings, in which.

DESCRIPTION OF EXAMPLE ASPECTS

Figure 1:
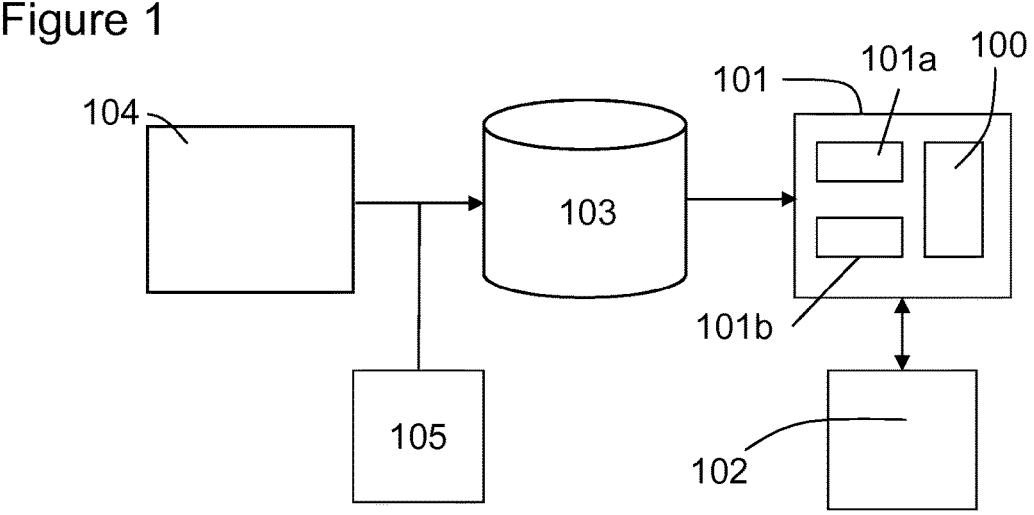
FIG. 1 illustrates an example embodiment of the apparatus along with a virtual reality apparatus.

Virtual reality (VR) may use a headset, such as glasses or goggles, or one or more displays that surround a user to provide a user with an immersive virtual experience. A virtual reality apparatus may present multimedia virtual reality content representative of a virtual reality space to a user to simulate the user being present within the virtual reality space. The virtual reality space may replicate a real world environment to simulate the user being physically present at a real world location or the virtual reality space may be computer generated or a combination of computer generated and real world multimedia content. The virtual reality space may be provided by a panoramic video, such as a video having a wide or 360° field of view (which may include above and/or below a horizontally oriented field of view). The virtual reality space thus provides a virtual 3-dimensional environment in which the video imagery of the VR content is provided for display. A user may be provided with a spatial subset of the virtual reality space as their VR view, i.e. a view port to view the video imagery of the VR space. The virtual reality apparatus may provide for user interaction with the virtual reality space displayed. The virtual reality content provided to the user may comprise live or recorded images of the real world, captured by a virtual reality content capture device such as a panoramic video capture device or virtual reality content capture device, for example. One example of a virtual reality content capture device is a Nokia OZO camera. The virtual reality space may provide a 360° or more field of view and may provide for panning/rotating around said field of view based on movement of the VR user's head or eyes. The virtual reality view of a virtual reality space may be provided to said user by virtual reality apparatus via displays in the headset. The virtual reality space may appear to the user of the VR apparatus as a three dimensional space created from images of the virtual reality content. Thus, the VR content may comprise images taken in multiple viewing directions that can be displayed and arranged together to form a (uninterrupted, continuous) wrap around field of view.

Virtual reality content may, by its nature, be immersive and may thereby comprise a large amount of data. The virtual reality content may comprise video imagery (i.e. moving images) that have a large spatial extent, such as to surround the user. The virtual reality view provided to the user may only cover an area of the video imagery smaller than the total area and the user may need to move the virtual reality view around to appreciate the whole spatial extent of the virtual reality space that the video imagery covers. It will be appreciated that with VR video imagery that progresses over time, it is not possible for the user to see all spatial parts of the video imagery at all times and therefore events or objects are inherently missed.

Thus, while a user is consuming VR content using a virtual reality apparatus they may be presented with, in their VR view, objects or events that enter their VR view from outside the field of view of their VR view that they have not seen before or only seen for a limited time. Further, while looking around the VR space at the video imagery, the user may spot an object or event (collectively referred to as a subject) that they have not seen before in their VR view or only seen for a limited time in their VR view up to that time point. Accordingly, the user may not realise where the object came from or what event(s) led to the event being witnessed because the historical position of the object or the historical position of the event (or chain of events that led to the event) was occurring at a spatial position in the VR space that was not within the user's VR view, i.e. they were looking elsewhere in the VR space. Further, even if historical occurrences of an object or event was present in the VR view provided to the user, the user may not have had their gaze or attention focussed on that part of the VR view and may have missed important events. This may be confusing for a user consuming VR content. Thus, ensuring that a user can make sense of objects and events presented in their VR view given the inherent inability in VR for them to view the whole spatial extent of the VR content at all times is important.

FIG. 1 shows an apparatus 100 configured to provide for one or more of generation or display of causal summary content comprising selected content from the virtual reality content at least prior to a time point in the virtual reality content currently viewed by the user, the causal summary content at least focussed on an object or event appearing in the at least one virtual reality view or the selected object to show historic occurrences of the object or event (including a chain of events) or selected object in the virtual reality content. Described below are various examples of how subjects are identified for which a user may wish to see causal summary content as well as various examples of how the causal summary content may be derived from the VR content.

The apparatus 100 may be part of a virtual reality device 101 configured to present the virtual reality content to a user. The virtual reality device 101 may present a VR view of a VR space to a user via a VR display 102, which may comprise a headset. The VR view provided to the user on the VR display 102 may be based on the orientation of the VR display, such that a user can look around the VR space by moving their head. It will be appreciated that other types of display and other means to "look around" the virtual reality space may be provided. In some examples, the apparatus 100 is functionally provided by a computer, the virtual reality device 101 or a computer server, each of which may comprise a memory 101a and a processor 101b, although in other examples the apparatus may be an electronic device, such as a computer, mobile telephone or other apparatus as listed hereinafter in communication with the VR device 101. The virtual reality device 101, in this example, is configured to receive virtual reality content from a virtual reality content store 103 where virtual reality content is stored (which may include being stored transiently or temporarily). Thus, the virtual reality content may be live content and the store 103 may be a memory or buffer of a display or onward transmission path. The apparatus 100 may receive indications of where the user is looking in the virtual reality space and data indicating the position of objects and/or events. The data indicating the position of objects and/or events may be predetermined or may be generated by the apparatus 100 or a different apparatus.

The VR content may be provided by a virtual reality content capture device 104. An apparatus 105 for generating predetermined causal data may be provided and the predetermined causal data may be stored with the VR content in the VR content store 103. The predetermined causal data may provide for tracking of the viewing direction of objects, events or chains of events over time that are present in the VR content. In one or more examples, the predefined causal data may be manually provided based on human analysis of the virtual reality content during capture or in post-production and thus the apparatus 105 may represent data entry of predefined causal data. In one or more examples, the predefined causal data may be automatically generated based on computer based image analysis of the video imagery, which may be provided during production of the VR content or after production. In one or more examples the predefined causal data is generated on-the-fly either as part of preparing the virtual reality content for display to the user, such as by the VR device 101, or during the display of the virtual reality content to the user. It will be appreciated that while the content capture device 104 and apparatus 105 are shown connected to the VR content store, this is only for appreciation of the overall system and the apparatus 100 may operate with recorded VR content with or without the predefined causal data apparatus 105.

In this embodiment the apparatus 100 (or other electronic device) mentioned above may have only one processor 101b and one memory 101a but it will be appreciated that other embodiments may utilise more than one processor and/or more than one memory (e.g. same or different processor/memory types). Further, the apparatus 100 may be an Application Specific Integrated Circuit (ASIC).

The processor may be a general purpose processor dedicated to executing/processing information received from other components, such as from content store 103 and the VR device 101 in accordance with instructions stored in the form of computer program code in the memory. The output signalling generated by such operations of the processor is provided onwards to further components, such as the VR apparatus 101 for display of causal summary content.

The memory (not necessarily a single memory unit) is a computer readable medium (solid state memory in this example, but may be other types of memory such as a hard drive, ROM, RAM, Flash or the like) that stores computer program code. This computer program code stores instructions that are executable by the processor, when the program code is run on the processor. The internal connections between the memory and the processor can be understood to, in one or more example embodiments, provide an active coupling between the processor and the memory to allow the processor to access the computer program code stored on the memory.

In this example the processor and memory are all electrically connected to one another internally to allow for electrical communication between the respective components. In this example the components are all located proximate to one another so as to be formed together as an ASIC, in other words, so as to be integrated together as a single chip/circuit that can be installed into an electronic device. In some examples one or more or all of the components may be located separately from one another.

Figure 2:
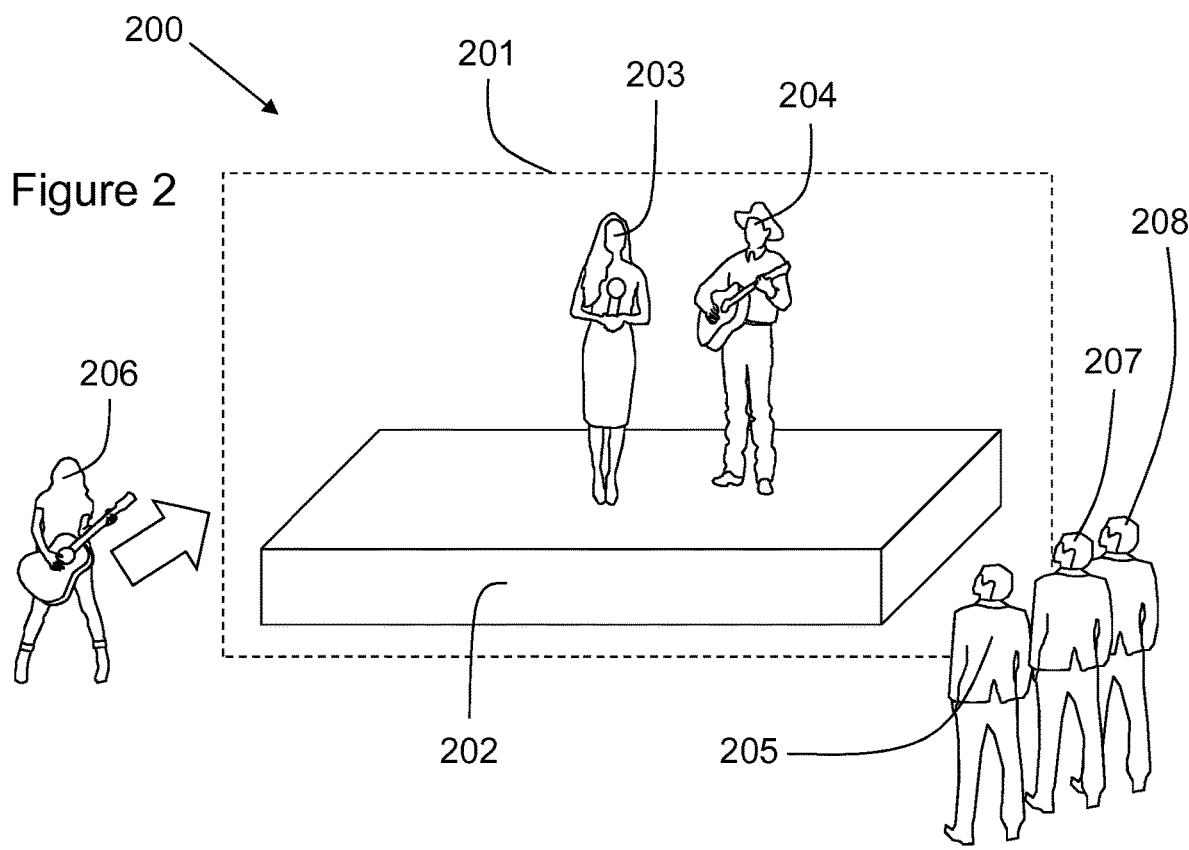
FIG. 2 illustrates an example virtual reality view of video imagery of a virtual reality space at a first time.

FIG. 2 shows part of the video imagery that is arranged to surround a VR viewer (i.e. the user) and thus comprise a VR space 200. The VR space 200 thus comprises a virtual three dimensional space in which the video imagery of the VR content is presented to the user. The user is presented with a VR view 201 (shown by the dotted line) comprising a spatial portion of the video imagery of the VR space. The VR view presented to the user changes over time as the video imagery progresses and as the user may control the VR apparatus 101 to look elsewhere in the VR space (such as by turning their head). FIG. 2 shows what is visible to the user in the VR view 201 provided to them (shown inside the dashed line), as well as features of the video imagery that are outside the VR view 201 (shown outside the dashed line). In this example, the dashed line is rectangular representing a substantially rectangular field of view of the VR view. However, it will be appreciated that the shape of the VR view could be any appropriate shape.

The VR view 201 shows the video imagery of the VR content featuring a stage 202, a singer 203 and a first musician 204. The head of a first audience member 205 is also visible in the user's VR view 201. With the user watching the stage 202 and the people on it, the user does not see a second musician 206 or other audience members 207, 208. The second musician 206 is playing her guitar to the side of the stage 202.

Figure 3:
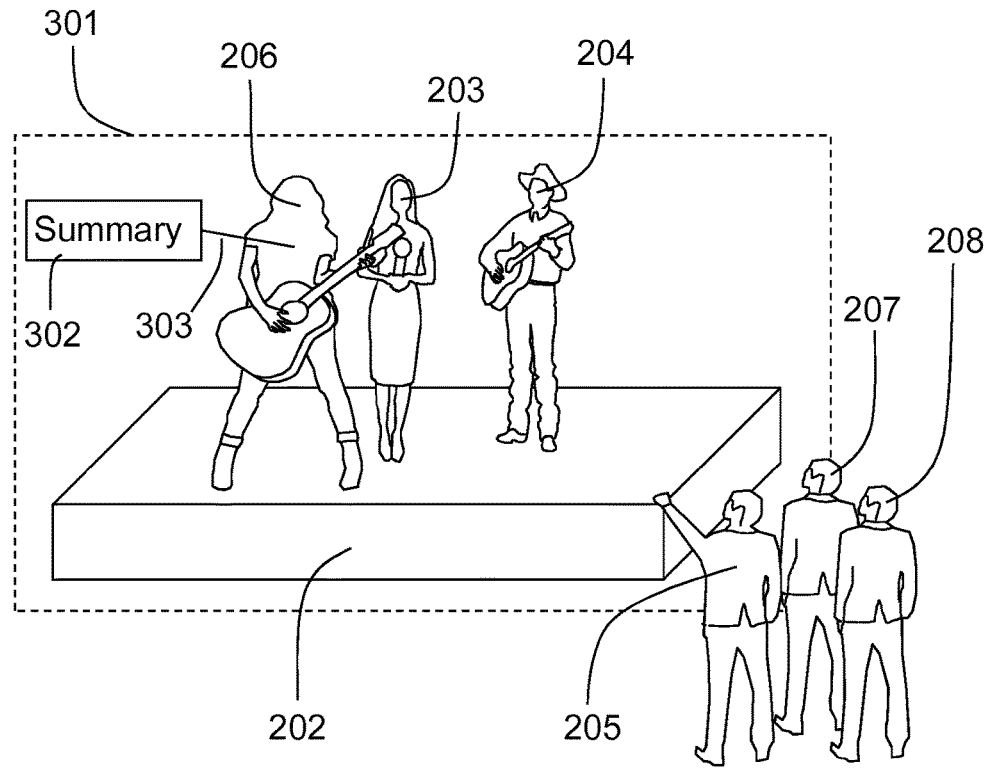
FIG. 3 illustrates an example virtual reality view of video imagery of a virtual reality space at a second time, later than the first time.

FIG. 3 shows a second VR view 301 provided to the user at a later time during consumption of the VR content. In the second VR view 301, the user still happens to be generally focused on the action occurring on the stage 202 (i.e. they have not, as it happens, looked away from the stage). However, the second musician 206 has now moved from the side of the stage 202 to the front of the stage 202. Further, the first audience member 205 has raised his arm and one of the other audience members 207 has moved slightly into the VR view 301.

Given that the user may have seen the second musician 206 for the first time at this point during the consumption of the VR content, they may be confused as to where she came from.

The apparatus 100 may provide for generation or display of causal summary content which comprises content, extracted from the VR content, that features an object, or shows how an event developed over time, or a chain of events or a combination of two or more of the above. Thus, the causal summary provides a summary of what caused the object to arrive in the VR view 301 or the cause of the event that is presented in the VR view to the user. Thus, causal summary content for the second musician 206 may comprise content extracted from the VR content that features the second musician 206 at least back from the time point at which the causal summary content was requested or generated or displayed. In another example, the causal summary content for a rolling football present in the VR view may comprise imagery of the movement of the football but may also present the person who perhaps kicked the football originally and show where they appeared from. Thus, the causal summary content may comprise historic imagery from the VR content that features a particular object or other objects related thereto. Likewise, the causal summary content may relate to an event, such as an injuring of character, and also feature the movement of an attacker of the injured character and a conversation of other characters in the video imagery who arrange for the attacker to attack the injured character, i.e. a chain of events leading to the event in question (the injuring of character).

The causal summary content may comprise one or more of;
  i) summary still imagery comprising a series of still images, such as frames from the video imagery;
  ii) summary video imagery extracted from the video imagery, such as one or more clips (discontinuous temporal sections) of the video imagery or spatially focussed continuous video imagery from the video imager of the VR content;
  iii) summary virtual reality content extracted from the video imagery of the virtual reality content wherein at least an initial viewing direction of the summary virtual reality content is aligned with the one or more of the selected object and viewing direction of the predefined causal data;
  iv) summary virtual reality content extracted from the video imagery of the virtual reality content wherein the summary virtual reality content has a spatial extent less than the spatial extent of the virtual reality content.

Thus, the summary content may be still images, "flat" video, or VR content that is focussed on the subject of the summary or has a restricted viewing direction to focus attention on the subject.

Figure 4:
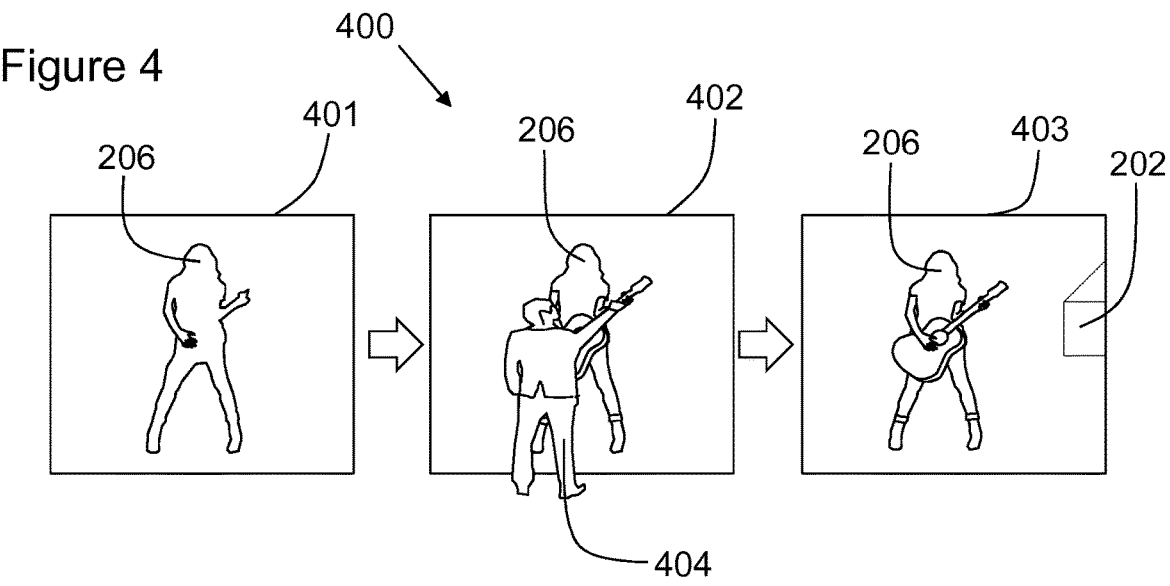
FIG. 4 illustrates an example causal summary content.

FIG. 4 shows an example of the causal summary content 400 for the example shown in FIGS. 2 and 3. The causal summary content in this example comprises a spatial subset of the video imagery of the VR content that is focussed on the second musician 206. A series of frames 401, 402, 403 from the summary is shown in FIG. 4 to illustrate the summary video. In the first frame the second musician 206 is shown entering the scene dancing but away from the stage 202. In the second frame 402, the second musician 206 is handed her guitar by a roadie 404. In the third frame 403, the second musician 206 is shown making her way to the stage 202 and a final frame of her on the stage (not shown), similar to what the user was presented with in FIG. 3. The causal summary thus provides a historical causal summary of an object or event up to a current time point in the VR content as consumed by the user.

The following describes how the apparatus 100 may determine on what basis to generate or display the causal summary content. Given that the causal summary content may relate to an object or event (including a chain of events), various examples of how such an object or event may be determined by the apparatus 100 is possible. In one or more examples, determination of the subject of the causal summary content is based on a viewing direction in the virtual reality space of at least one virtual reality view provided to the user. Accordingly, the current virtual reality view may be used to determine the subject of the causal summary content or what subject(s) have been in recent virtual reality views provided to the user (rather than a most recent view for example).

In one example, one or more (e.g. recent) viewing directions of the VR view in the virtual reality space is compared to predefined causal data, the predefined causal data comprising viewing directions of various objects or events that may be the subject of causal summary content. The fact that predefined causal data is available for an object or event currently in the VR view may prompt the apparatus 100 to provide for generation or display of summary content. In other examples, the apparatus may request user input to view suggested summary content prior to its generation or display.

In one or more examples, one or more viewing directions of the VR view in the virtual reality space is compared to predefined causal data, the predefined causal data comprising viewing directions of various objects or events that may be the subject of causal summary content. The apparatus may be configured to determine which subject(s) defined in the predefined causal data is currently presented in the current/recent VR view but was not provided in a non-current/less recent VR view. Accordingly, predefined causal data for subjects that were not always visible to the user in the VR view are identified as subjects of summary causal content in which the user may be interested. The apparatus may provide for generation or display of the summary causal content of the identified subject(s). In other examples, the apparatus may request user input to view suggested causal summary content prior to its generation or display, such as by way of a causal-summary-content indicator, which will be described in more detail below.

In one or more examples, determination of the subject of the causal summary content is based on a selected object in the video imagery. The object may be selected by the user. Thus, the apparatus may be configured to provide for generation or display of the causal summary content based on a user selected object in the video imagery, which may be video imagery in the current VR view.

In one or more examples, determination of the subject of the causal summary content is based on a selected object in the video imagery that is automatically selected by the apparatus. Accordingly, the apparatus may be configured, using image recognition, to select different subjects in the VR view provided to the user and, based thereon, provide for generation or display of causal summary content related to said subject, possibly after a user request to play causal summary content, which may have been suggested to them.

Accordingly, the identification of a subject of the causal summary content may be based on the viewing direction or a subject selected (manually by the user or automatically by image recognition) in the video imagery.

As mentioned above the causal summary content shows the historic occurrences related to a subject (i.e. object, selected object or event) in the video imagery of the VR content. The following describes how the apparatus 100 may select content from the video imagery to form the causal summary content. As described above the subject of the causal summary content may be determined by at least one or more of a VR view viewing direction with reference to predetermined causal data, a manually selected object or an automatically selected subject.

In one or more examples, the predefined causal data used to identify a subject for provision of the causal summary content is used to provide the selected content of the causal summary content. The viewing direction related to the subject is used to spatially select spatial portions of the VR content for presentation as the causal summary content. Thus, the predefined causal data, comprising references to spatial portions of the video imagery over time related to the subject (object or selected object is present or the event occurs) identifies which parts of the VR content is selected to form the causal summary content. The apparatus 100 may provide for further selection of discontinuous temporal section or images from the video imagery selected by use of the predefined causal data.

FIG. 3 further shows a causal-summary-content indicator that is provided to indicate the availability of causal summary content. In this example, the causal-summary-content indicator is a graphic provided for display in the VR view, although in other examples the indicator may be an audible indicator. A causal-summary-content indicator 302 may be shown following user selection of a subject or following automatic selection of the subject, as will be described further below. The causal-summary-content indicator 302 may be displayed in a location to associate it with the subject or include a lead line 303 or other indication to identify the subject to which it relates. The causal-summary-content indicator 302 may be actuatable and, upon actuation, the apparatus may be configured to provide for display of the causal summary content of the associated subject.

Figure 5:
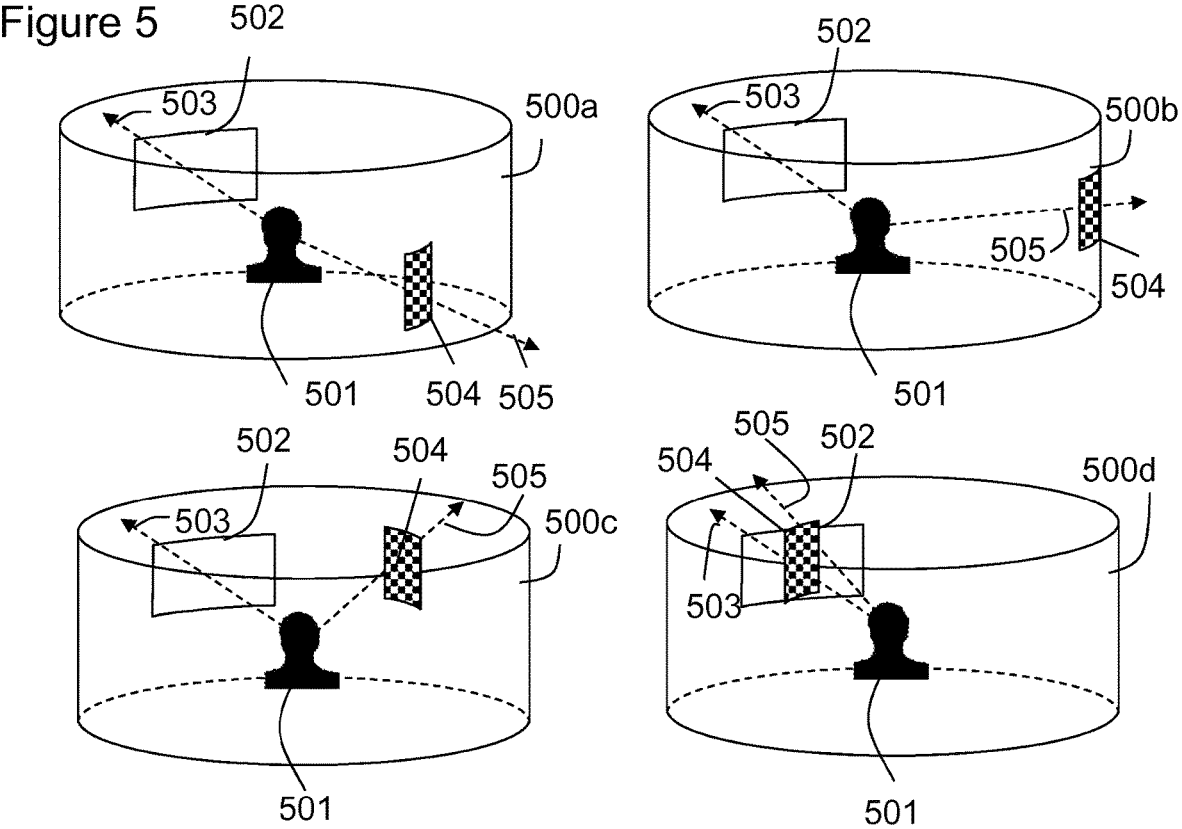
FIG. 5 illustrates an example virtual reality space over time.

FIG. 5 shows a virtual reality space 500a-d at a series of time points. The virtual reality space is shown as a cylindrical ring surrounding a user 501 to illustrate how the video imagery is arranged to wrap around the user 501. The VR view provided to the user is shown as box 502. The VR view has a viewing direction in the VR space shown by arrow 503. The position of the second musician 206 relative to the VR view 502 provided to the user is shown as box 504. The position of the box 504 may be known to the apparatus through the predefined causal data or by image analysis. The box 504 (i.e. the subject) has a viewing direction 505. Over time, as shown by consecutive virtual reality spaces 500a-d, the viewing direction 505 of the subject 504 is initially outside the VR view 502 in 500a, 500b, 500c but is progressively moving towards the VR view provided to the user. At the time of VR space 500d, the subject 504 (second musician 206) has arrived in the VR view 502 provided to the user, which can be determined by the viewing direction 505 and the viewing direction 503 aligning with a threshold, such as 5, 10, 15, 20 degrees or the viewing direction 505 being within a boundary defined by the VR view 502.

Figure 6:
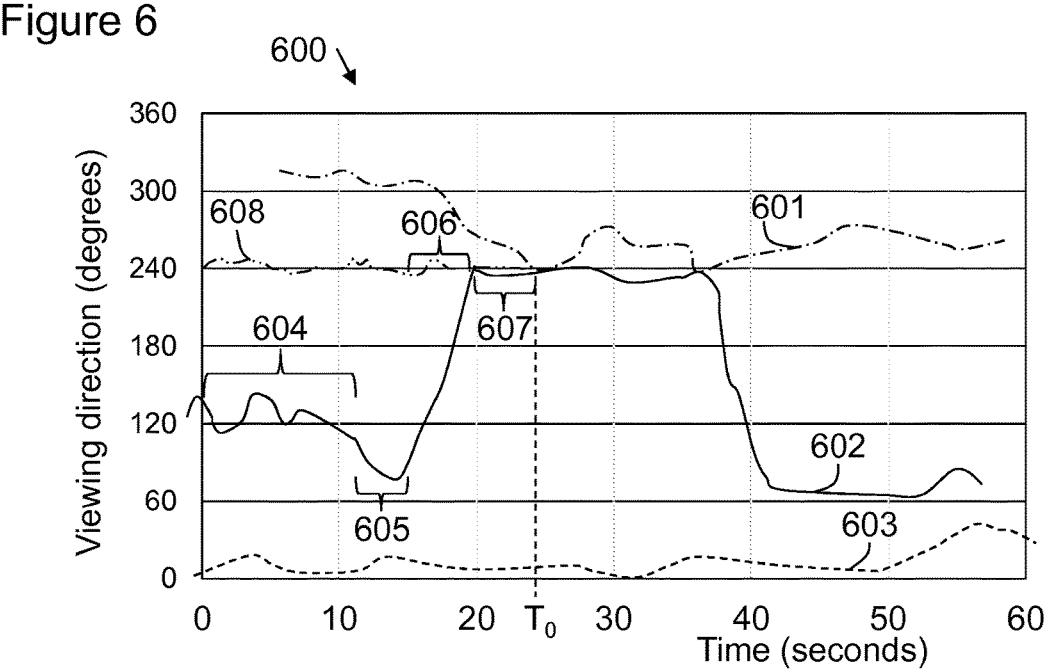
FIG. 6 illustrates example predefined causal data sets.

FIG. 6 shows an example of the predefined causal data 600 presented in the form of a graph showing viewing angle over time. In this example, a two dimensional viewing direction angle is shown, thereby referencing a direction in substantially horizontal plane for example. In other examples the viewing direction may be presented as a direction in three dimensions, such as by way of an azimuth and altitude. In some other examples, in particular those which involve three dimensional (3D) content, also the distance or depth at which the user looks at might be taken into account. The predefined causal data 600 comprises a plurality of data sets 601, 602, 603 wherein each data set comprises the viewing direction in the virtual reality space versus time thereby providing a reference to portions of the video imagery to track the spatial location in the virtual reality space related to the subject in the video imagery over time.

Thus, the data set 602 may relate to the second musician 206. A first section 604 of the data set 602 may relate to position in the virtual reality space of the second musician 206 while dancing, as shown in frame 401. A second section 605 may relate to their spatial position when receiving their guitar, as shown in frame 402. A third section 606 may relate to the second musician 206 making their way to the stage as shown in frame 403. A fourth section 607 may relate to the position of the second musician present on the stage 202. Time $T_0$ is shown as the time during consumption of the VR content that the user requested to view the causal summary content and thus, in this example, the causal summary content ends at this time point. In other examples, the causal summary content may include events that occur in the future relative to the time point $T_0$.

The viewing direction of the VR view provided to the user (based on where they are looking using the VR apparatus 101) is shown superimposed on the graph of FIG. 6 as line 608 to demonstrate the correlation between the VR view direction and the predefined causal data 600. Consistent with the example described above, the VR view viewing direction 608 aligns with (or aligns within a threshold angle) with the viewing direction (representing the spatial position) of the second musician 206 only when the second musician arrives on the stage 202. The relationship between the VR view viewing direction and the predefined causal data sets may be used in a number of ways.

Firstly, the apparatus may be configured to compare the direction of the VR view 608 to the viewing direction of the objects or events (subjects) defined in by the predefined causal data, collectively 601, 602, 603. The comparison can be used to determine automatically whether the user has missed an object of (possible) interest, by virtue of non-alignment between the relevant directions, and suggest to the user that they view the causal summary content related to that object. Thus, at the fourth section 607 the apparatus may determine that the user is viewing the second musician 206 by virtue of alignment within a threshold and possibly for a predetermined amount of time between VR view direction 608 and the data set 602. However, the apparatus may consider whether or not the user was viewing the second musician 206 (or any object for which there is a data set) prior to this time point. Time thresholds may be used to determine if the user is currently looking at a particular subject (using a first predetermined period of time) and if they were not looking at the same subject in the past (using a second predetermined period of time). The apparatus may determine that the user, historically, did not view the second musician 206 by virtue of the non-alignment of VR view direction 608 and data set 602. Accordingly, a suggestion to the user of the option of watching causal summary content or the provision of generation or display of such causal summary may thus be provided.

Secondly, the predefined causal data may be used to generate or display the causal summary content. Thus, once an object has been identified as interesting to a user, either by way of selection by the user or automatically by analysis as described above, the viewing directions specified by the predefined causal data sets 601, 602, 603 can be used to extract still or video imagery from the VR content that focuses on that object for use in providing the causal summary content.

In one or more examples, the selected content for use in generation or display of the causal summary content is selected based on image analysis of the video imagery to identify the selected object or an object in said at least one virtual reality view provided to the user in at least temporally prior video imagery of the virtual reality content. Thus, rather than rely on predefined causal data to track objects in the VR content, the apparatus may be configured to identify an object identified as interesting by selection by the user or by automated image analysis and then using image analysis and object recognition techniques, identify where in the video imagery the same object appears at least prior to the current viewing time. Thus, a user may identify any object in the video imagery and the apparatus may be configured to provide for "searching" of the video imagery of the VR content in order to provide the causal summary content for that object.

In one or more examples, the image analysis and object recognition techniques can be used to automatically identify objects that the user has missed in a similar way to the non-alignment of the predefined causal data sets with the VR viewing direction, described above.

Thus, either by use of predefined causal data or image analysis, the apparatus may provide un-viewed content as at least part of the causal summary content. The amount of un-viewed content forming part of the causal summary content may be user set. It may be advantageous to include at least some viewed content as well as un-viewed content to ensure the user can give temporal context to the un-viewed content given what they have witnessed of a particular subject.

It will be appreciated that other user input, such as provided by input to a touchscreen or other man machine interface. In other examples, the user input comprises one or more of a translation motion, user actuation of a graphical user interface element, or a voice or sight command.

Figure 7:
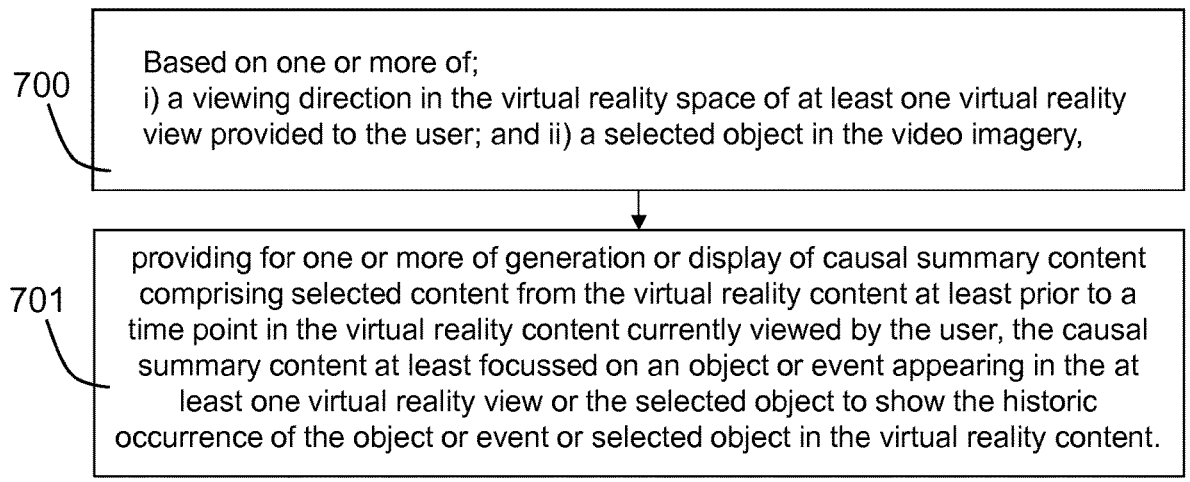
FIG. 7 shows a flowchart illustrating an example method.

FIG. 7 shows a flow diagram illustrating the steps of based on 700 one or more of; i) a viewing direction in the virtual reality space of at least one virtual reality view provided to the user; and ii) a selected object in the video imagery providing 701 for one or more of generation or display of causal summary content comprising selected content from the virtual reality content at least prior to a time point in the virtual reality content currently viewed by the user, the causal summary content at least focussed on an object or event appearing in the at least one virtual reality view or the selected object to show the historic occurrence of the object or event or selected object in the virtual reality content.

Figure 8:
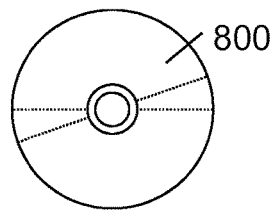
FIG. 8 shows a computer readable medium.

FIG. 8 illustrates schematically a computer/processor readable medium 800 providing a program according to an example. In this example, the computer/processor readable medium is a disc such as a digital versatile disc (DVD) or a compact disc (CD). In some examples, the computer readable medium may be any medium that has been programmed in such a way as to carry out an inventive function. The computer program code may be distributed between the multiple memories of the same type, or multiple memories of a different type, such as ROM, RAM, flash, hard disk, solid state, etc.

User inputs may be gestures which comprise one or more of a tap, a swipe, a slide, a press, a hold, a rotate gesture, a static hover gesture proximal to the user interface of the device, a moving hover gesture proximal to the device, bending at least part of the device, squeezing at least part of the device, a multi-finger gesture, tilting the device, or flipping a control device. Further the gestures may be any free space user gesture using the user's body, such as their arms, or a stylus or other element suitable for performing free space user gestures.

The apparatus shown in the above examples may be a portable electronic device, a laptop computer, a mobile phone, a Smartphone, a tablet computer, a personal digital assistant, a digital camera, a smartwatch, smart eyewear, a pen based computer, a non-portable electronic device, a desktop computer, a monitor, a household appliance, a smart TV, a server, a wearable apparatus, a virtual reality apparatus, or a module/circuitry for one or more of the same.

Any mentioned apparatus and/or other features of particular mentioned apparatus may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some examples, a particular mentioned apparatus may be pre-programmed with the appropriate software to carry out desired operations, and wherein the appropriate software can be enabled for use by a user downloading a "key", for example, to unlock/enable the software and its associated functionality. Advantages associated with such examples can include a reduced requirement to download data when further functionality is required for a device, and this can be useful in examples where a device is perceived to have sufficient capacity to store such pre-programmed software for functionality that may not be enabled by a user.

Any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

Any "computer" described herein can comprise a collection of one or more individual processors/processing elements that may or may not be located on the same circuit board, or the same region/position of a circuit board or even the same device. In some examples one or more of any mentioned processors may be distributed over a plurality of devices. The same or different processor/processing elements may perform one or more functions described herein.

The term "signalling" may refer to one or more signals transmitted as a series of transmitted and/or received electrical/optical signals. The series of signals may comprise one, two, three, four or even more individual signal components or distinct signals to make up said signalling. Some or all of these individual signals may be transmitted/received by wireless or wired communication simultaneously, in sequence, and/or such that they temporally overlap one another.

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/examples may consist of any such individual feature or combination of features. In view of the foregoing description it will be evident to a person skilled in the art that various modifications may be made within the scope of the disclosure.

While there have been shown and described and pointed out fundamental novel features as applied to examples thereof, it will be understood that various omissions and substitutions and changes in the form and details of the devices and methods described may be made by those skilled in the art without departing from the scope of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/ or described in connection with any disclosed form or examples may be incorporated in any other disclosed or described or suggested form or example as a general matter of design choice. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. An apparatus comprising:
at least one processor; and
at least one non-transitory memory including computer program code, the at least one memory and the computer program code configured to, with the at least one processor, cause the apparatus to perform at least the following:
present at least one virtual reality view to a user for viewing virtual reality content comprising video imagery configured to provide a virtual reality space for viewing in virtual reality, wherein the at least one virtual reality view comprises a spatial portion of the video imagery that forms the virtual reality space, the spatial portion of the at least one virtual reality view being smaller in spatial extent than a spatial extent of the video imagery of the virtual reality space; and
provide for one or more of generation of causal summary content, or display of the causal summary content, the causal summary content comprising selected content from the virtual reality content at least prior to a current time point in the virtual reality content currently viewed with the user, the causal summary content at least focused on an object or event within the at least one virtual reality view presented to the user;
wherein the providing of the one or more of the generation of the causal summary content, or the display of the causal summary content, is based on the at least one virtual reality view presented to the user not including the object or the event for at least a period of time prior to the current time point in the virtual reality content currently viewed with the user to show to the user what caused the object or the event to be within the at least one virtual reality view presented to the user;
wherein the providing of the one or more of the generation of the causal summary content, or the display of the causal summary content, is further based on one or more of:
the user viewing the object or event that the user has not viewed previously in the at least one virtual reality view, and the user not viewing at least one preceding event within the virtual reality space that led to the object or event being viewed with the user, due to the user viewing elsewhere in the virtual reality space and not having viewed the at least one preceding event; or
the user viewing the object or event for a limited time in the at least one virtual reality view, and the user not viewing the at least one preceding event within the virtual reality space that led to the object or event being viewed with the user, due the user having viewed the object for the limited amount of time and not having viewed the at least one preceding event;
wherein the providing of the one or more of the generation of the causal summary content, or the display of the causal summary content, is further based on one or more of i) a viewing direction of the at least one virtual reality view provided to the user in the virtual reality space; or ii) a selection of the object in the video imagery providing the virtual reality space;
wherein the selected content is selected based on pre-defined causal data comprising references to spatial portions of the video imagery over time in which the object or selected object is present or the event occurs, wherein a viewing direction of at least one of the spatial portions is common with the viewing direction of the at least one virtual reality view provided to the user or the viewing direction of the selected object;

wherein the predefined causal data comprises one or more predefined causal data sets, each predefined causal data set providing for spatial tracking of one or more of an object, an event or a chain of events in the video imagery over time and the selected content is determined based on a selection of one of the plurality of predefined causal data sets, the selection based on comparison between viewing directions of the virtual reality view provided to the user and the viewing directions of each of the plurality of predefined causal data sets;

wherein the selected content is further selected based on determining that the user is viewing the selected content through virtue of an alignment, within a first threshold for a first predetermined amount of time, of a section of at least one of the plurality of predefined causal data sets and a section of a data set corresponding to the spatial portion common with the viewing direction of the at least one virtual reality view provided to the user;

wherein the providing of the one or more of the generation of the causal summary content, or the display of the causal summary content, is based on determining that the user did not during a second predetermined amount of time period previously view the selected content through virtue of a misalignment, above a second threshold for the second predetermined amount of time, of a section of the at least one of the plurality of predefined causal data sets and a section of the data set corresponding to the spatial portion common with the viewing direction of the at least one virtual reality view provided to the user.

2. The apparatus of claim 1, wherein the providing of the causal summary content is further based on a comparison between the viewing direction of the virtual reality view presented to the user and the predefined causal data, and the identification of an object, event or chain of events that the user has viewed for at least a first predetermined period of time and has not viewed for at least a second predetermined period of time.

3. The apparatus of claim 1, wherein the predefined causal data comprises a data set of at least the viewing direction in the virtual reality space versus time thereby providing a reference to portions of the video imagery to track a spatial location in the virtual reality space of an object or event or chain of events appearing in the video imagery over time.

4. The apparatus of claim 1, wherein the selected content is selected based on;
image analysis of the video imagery to identify the selected object or an object in the at least one virtual reality view presented to the user in at least temporally prior video imagery of the virtual reality content.

5. The apparatus of claim 1, wherein the selected object in the video imagery is user selected.

6. The apparatus of claim 1, wherein an object in the video imagery is automatically selected as the selected object based on the viewing direction of the current virtual reality view aligning with the object within a threshold.

7. The apparatus of claim 1, wherein the causal summary content comprises one or more of;
i) summary video imagery extracted from the video imagery of the virtual reality content;
ii) summary still imagery extracted from the video imagery of the virtual reality content;
iii) summary virtual reality content extracted from the video imagery of the virtual reality content wherein at least an initial viewing direction of the summary virtual reality content is aligned with the one or more of the selected object and the viewing direction of the predefined causal data; or
iv) summary virtual reality content extracted from the video imagery of the virtual reality content wherein the summary virtual reality content has a spatial extent less than a spatial extent of the virtual reality content.

8. The apparatus of claim 1, wherein the selected content of the causal summary content is further selected based on a comparison between viewing directions of the virtual reality view presented to the user prior to the current time point in the virtual reality content currently viewed with the user and the viewing direction of the portions of video imagery defined in the predefined causal data or the viewing directions of the selected object, to thereby provide unviewed content as at least part of the causal summary content.

9. The apparatus of claim 1, wherein the apparatus provides for display of the causal summary content in response to a user input request to play the causal summary content following the provision of a causal-summary-content indicator indicative of the availability of the causal summary content.

10. The apparatus of claim 9, wherein the causal-summary-content indicator is one or more of a graphic provided for display in the virtual reality view or an audible indicator.

11. The apparatus of claim 1, wherein the one or more of the generation of the causal summary content, or the display of the causal summary content is provided from at least a beginning of the period of time of the at least one virtual reality view presented to the user not including the object or the event prior to the current time point in the virtual reality content currently viewed with the user, up to at least the current time point in the virtual reality content currently being viewed with the user.

12. A method comprising:
presenting at least one virtual reality view to a user for viewing virtual reality content comprising video imagery configured to provide a virtual reality space for viewing in virtual reality, wherein the at least one virtual reality view comprises a spatial portion of the video imagery that forms the virtual reality space, the spatial portion of the at least one virtual reality view being smaller in spatial extent than a spatial extent of the video imagery of the virtual reality space; and
providing for one or more of generation of causal summary content, or display of the causal summary content, the causal summary content comprising selected content from the virtual reality content at least prior to a current time point in the virtual reality content currently viewed with the user, the causal summary content at least focused on an object or event within the at least one virtual reality view presented to the user;
wherein the providing of the one or more of the generation of the causal summary content, or the display of the causal summary content, is based on the at least one virtual reality view presented to the user not including the object or the event for at least a period of time prior to the current time point in the virtual reality content currently viewed with the user to show to the user what caused the object or the event to be within the at least one virtual reality view presented to the user;
wherein the providing of the one or more of the generation of the causal summary content, or the display of the causal summary content, is further based on one or more of:

the user viewing the object or event that the user has not viewed previously in the at least one virtual reality view, and the user not viewing at least one preceding event within the virtual reality space that led to the object or event being viewed with the user, due to the user viewing elsewhere in the virtual reality space and not having viewed the at least one preceding event; or the user viewing the object or event for a limited time in the at least one virtual reality view, and the user not viewing the at least one preceding event within the virtual reality space that led to the object or event being viewed with the user, due the user having viewed the object for the limited amount of time and not having viewed the at least one preceding event;

wherein the providing of the one or more of the generation of the causal summary content, or the display of the causal summary content, is further based on one or more of i) a viewing direction of the at least one virtual reality view provided to the user in the virtual reality space; or ii) a selection of the object in the video imagery providing the virtual reality space;

wherein the selected content is selected based on predefined causal data comprising references to spatial portions of the video imagery over time in which the object or selected object is present or the event occurs, wherein a viewing direction of at least one of the spatial portions is common with the viewing direction of the at least one virtual reality view provided to the user or the viewing direction of the selected object;

wherein the predefined causal data comprises one or more predefined causal data sets, each predefined causal data set providing for spatial tracking of one or more of an object, an event or a chain of events in the video imagery over time and the selected content is determined based on a selection of one of the plurality of predefined causal data sets, the selection based on comparison between viewing directions of the virtual reality view provided to the user and the viewing directions of each of the plurality of predefined causal data sets;

wherein the selected content is further selected based on determining that the user is viewing the selected content through virtue of an alignment, within a first threshold for a first predetermined amount of time, of a section of at least one of the plurality of predefined causal data sets and a section of a data set corresponding to the spatial portion common with the viewing direction of the at least one virtual reality view provided to the user;

wherein the providing of the one or more of the generation of the causal summary content, or the display of the causal summary content, is based on determining that the user did not during a second predetermined amount of time period previously view the selected content through virtue of a misalignment, above a second threshold for the second predetermined amount of time, of a section of the at least one of the plurality of predefined causal data sets and a section of the data set corresponding to the spatial portion common with the viewing direction of the at least one virtual reality view provided to the user.

13. The method of claim 12, wherein the providing of the causal summary content is further based on a comparison between the viewing direction of the virtual reality view presented to the user and the predefined causal data, and the identification of an object, event or chain of events that the user has viewed for at least a first predetermined period of time and has not viewed for at least a second predetermined period of time.

14. The method of claim 12, wherein the selected content is selected based on;
    image analysis of the video imagery to identify the selected object or an object in the at least one virtual reality view presented to the user in at least temporally prior video imagery of the virtual reality content.

15. The method of claim 12, wherein the selected object in the video imagery is user selected.

16. The method of claim 12, wherein an object in the video imagery is automatically selected as the selected object based on the viewing direction of the current virtual reality view aligning with the object within a threshold.

17. A non-transitory computer readable medium comprising program instructions stored thereon for performing at least the following:
    presenting at least one virtual reality view to a user for viewing virtual reality content comprising video imagery configured to provide a virtual reality space for viewing in virtual reality, wherein the at least one virtual reality view comprises a spatial portion of the video imagery that forms the virtual reality space, the spatial portion of the at least one virtual reality view being smaller in spatial extent than a spatial extent of the video imagery of the virtual reality space; and
    providing for one or more of generation of causal summary content, or display of the causal summary content, the causal summary content comprising selected content from the virtual reality content at least prior to a current time point in the virtual reality content currently viewed with the user, the causal summary content at least focused on an object or event within the at least one virtual reality view presented to the user;
    wherein the providing of the one or more of the generation of the causal summary content, or the display of the causal summary content, is based on the at least one virtual reality view presented to the user not including the object or the event for at least a period of time prior to the current time point in the virtual reality content currently viewed with the user to show to the user what caused the object or the event to be within the at least one virtual reality view presented to the user;
    wherein the providing of the one or more of the generation of the causal summary content, or the display of the causal summary content, is further based on one or more of:
    the user viewing the object or event that the user has not viewed previously in the at least one virtual reality view, and the user not viewing at least one preceding event within the virtual reality space that led to the object or event being viewed with the user, due to the user viewing elsewhere in the virtual reality space and not having viewed the at least one preceding event; or
    the user viewing the object or event for a limited time in the at least one virtual reality view, and the user not viewing the at least one preceding event within the virtual reality space that led to the object or event being viewed with the user, due the user having viewed the object for the limited amount of time and not having viewed the at least one preceding event;
    wherein the providing of the one or more of the generation of the causal summary content, or the display of the causal summary content, is further based on one or more of i) a viewing direction of the at least one virtual reality view provided to the user in the virtual reality space; or ii) a selection of the object in the video imagery providing the virtual reality space;

wherein the selected content is selected based on predefined causal data comprising references to spatial portions of the video imagery over time in which the object or selected object is present or the event occurs, wherein a viewing direction of at least one of the spatial portions is common with the viewing direction of the at least one virtual reality view provided to the user or the viewing direction of the selected object;

wherein the predefined causal data comprises one or more predefined causal data sets, each predefined causal data set providing for spatial tracking of one or more of an object, an event or a chain of events in the video imagery over time and the selected content is determined based on a selection of one of the plurality of predefined causal data sets, the selection based on comparison between viewing directions of the virtual reality view provided to the user and the viewing directions of each of the plurality of predefined causal data sets;

wherein the selected content is further selected based on determining that the user is viewing the selected content through virtue of an alignment, within a first threshold for a first predetermined amount of time, of a section of at least one of the plurality of predefined causal data sets and a section of a data set corresponding to the spatial portion common with the viewing direction of the at least one virtual reality view provided to the user;

wherein the providing of the one or more of the generation of the causal summary content, or the display of the causal summary content, is based on determining that the user did not during a second predetermined amount of time period previously view the selected content through virtue of a misalignment, above a second threshold for the second predetermined amount of time, of a section of the at least one of the plurality of predefined causal data sets and a section of the data set corresponding to the spatial portion common with the viewing direction of the at least one virtual reality view provided to the user.

\* \* \* \* \*